(12) United States Patent
Swearman

(10) Patent No.: US 10,968,049 B2
(45) Date of Patent: Apr. 6, 2021

(54) CAN BODY LINEAR LOADER ASSEMBLY

(71) Applicant: Crown Packaging Technology, Inc., Alsip, IL (US)

(72) Inventor: Nicholas Adam Swearman, Harrogate (GB)

(73) Assignee: Crown Packaging Technology, Inc., Alsip, IL (US)

(*) Notice: Subject to any disclaimer, the term of this patent is extended or adjusted under 35 U.S.C. 154(b) by 0 days.

(21) Appl. No.: 16/515,696

(22) Filed: Jul. 18, 2019

(65) Prior Publication Data

US 2020/0024080 A1  Jan. 23, 2020

Related U.S. Application Data

(60) Provisional application No. 62/701,052, filed on Jul. 20, 2018.

(51) Int. Cl.
*B65G 47/84* (2006.01)
*B65G 17/46* (2006.01)
*B65G 43/08* (2006.01)
*B65G 47/82* (2006.01)

(52) U.S. Cl.
CPC .......... *B65G 47/846* (2013.01); *B65G 17/46* (2013.01); *B65G 43/08* (2013.01); *B65G 47/82* (2013.01); *B65G 2201/0252* (2013.01)

(58) Field of Classification Search
CPC .... B65G 47/57; B65G 21/2036; B65G 47/26; B65G 47/846; B65G 17/46; B65G 2201/0252; B65G 47/82; B65G 43/08; B65G 21/0236; B65G 21/2027; B65B 61/26

USPC .......... 198/428, 689.1, 478.1, 459.2
See application file for complete search history.

(56) References Cited

U.S. PATENT DOCUMENTS

| | | | | |
|---|---|---|---|---|
| 3,223,028 A * | 12/1965 | Brigham | ............... | B41F 31/302 101/40 |
| 3,616,778 A * | 11/1971 | Sirvet et al. | ............ | B41F 17/14 118/262 |
| 3,766,851 A * | 10/1973 | Sirvet | ..................... | B41F 17/22 101/40 |
| 4,263,846 A * | 4/1981 | Eldred | ................ | B41F 15/0886 101/123 |
| 4,565,713 A * | 1/1986 | Schultz | .................... | B05D 3/06 101/40 |
| 4,596,107 A | 6/1986 | Pfleger, Sr. | | |
| 4,768,642 A | 9/1988 | Hunter | | |
| 4,942,955 A * | 7/1990 | Shriver | ................. | B05C 13/025 198/438 |
| 6,161,677 A * | 12/2000 | van der Griendt | .......................... | B65G 21/2036 198/457.03 |
| 6,510,938 B1 | 1/2003 | Bowlin | | |
| 9,770,922 B2 | 9/2017 | Cofler | | |
| 2003/0000078 A1* | 1/2003 | Betti | ....................... | B26D 3/16 29/822 |

(Continued)

FOREIGN PATENT DOCUMENTS

EP           3307631 A1    4/2018
WO    WO 2011/113710 A1    9/2011
WO    WO 2016/200748 A1   12/2016

*Primary Examiner* — James R Bidwell
(74) *Attorney, Agent, or Firm* — BakerHostetler

(57) ABSTRACT

A can body loader assembly includes a turret starwheel having asymmetrical pockets and a vacuum belt that provides a precise pitch dimension between adjacent cans.

20 Claims, 6 Drawing Sheets

(56) References Cited

U.S. PATENT DOCUMENTS

2014/0238821 A1\* 8/2014 Woinski ................ B65G 17/46
                                                                198/464.2
2016/0001984 A1    1/2016 Benz \* cited by examiner

CAN BODY LINEAR LOADER ASSEMBLY

CROSS-REFERENCE TO RELATED APPLICATIONS

This claims priority to U.S. Patent Application Ser. No. 62/701,052 filed Jul. 20, 2018, the disclosure of which is hereby incorporated by reference as if set forth in its entirety herein.

TECHNICAL FIELD

The invention relates to manufacturing machinery, and more particularly for machinery and methods for feeding articles.

BACKGROUND

Beverage can bodies are produced in vast quantities. And the can bodies must be decorated in the same vast quantities in automated processes that are fast and reliable. A common type of can body decorator includes a large wheel that rotates the cans over printing blankets. Rotating decorators are commercially available from Stolle Machinery Company and from CMB Engineering Company, which is a sister company to the assignee of the present invention.

Digital printing of cans is under development. For example, a process disclosed in U.S. Pat. No. 9,770,922, entitled "Printing System and Method," uses inkjet printers at a printing station. A carriage moves an array of cans on a track, such as a Rockwell iTRAK™, and into and out of the printing station. The carriage includes mandrels that are inserted into the cans.

SUMMARY

An aspect of the present disclosure provides a beverage can body loader assembly comprising a pair of opposing loader subassemblies. Each subassembly comprises a can loading turret, a vacuum belt, and a control system. The can loading turret is adapted to receive horizontally oriented beverage can bodies, and is further adapted to discharge the can bodies at a predetermined pitch. The vacuum belt extends from a discharge region of the can loading turret. The belt is adapted to receive the can bodies discharged from the can loading turret and adapted to transport the can bodies in the horizontal orientation at the predetermined pitch. The control system is configured to (i) start the can loading turret and vacuum belt to position an array of can bodies on the vacuum belt, (ii) to pause during an unloading phase in which a group of the can bodies is removed from the vacuum belt, and (iii) restart the can loading turret and vacuum belt to position another array of can bodies on the vacuum belt.

Another aspect of the present disclosure provides a method for feeding beverage can bodies. The method comprises: (a) feeding can bodies to a can loading turret; (b) handing off the can bodies to pockets of the can loading turret; (c) releasing the cans from a discharge region on the can loading turret and feeding the can bodies onto a linear vacuum belt at a predetermined pitch; (d) conveying the can bodies on the belt toward a discharge end of the belt; and (e) pausing motion of the belt and the can loading turret while the can bodies are removed from the belt.

DETAILED DESCRIPTION OF ILLUSTRATIVE EMBODIMENTS

Figure 1:
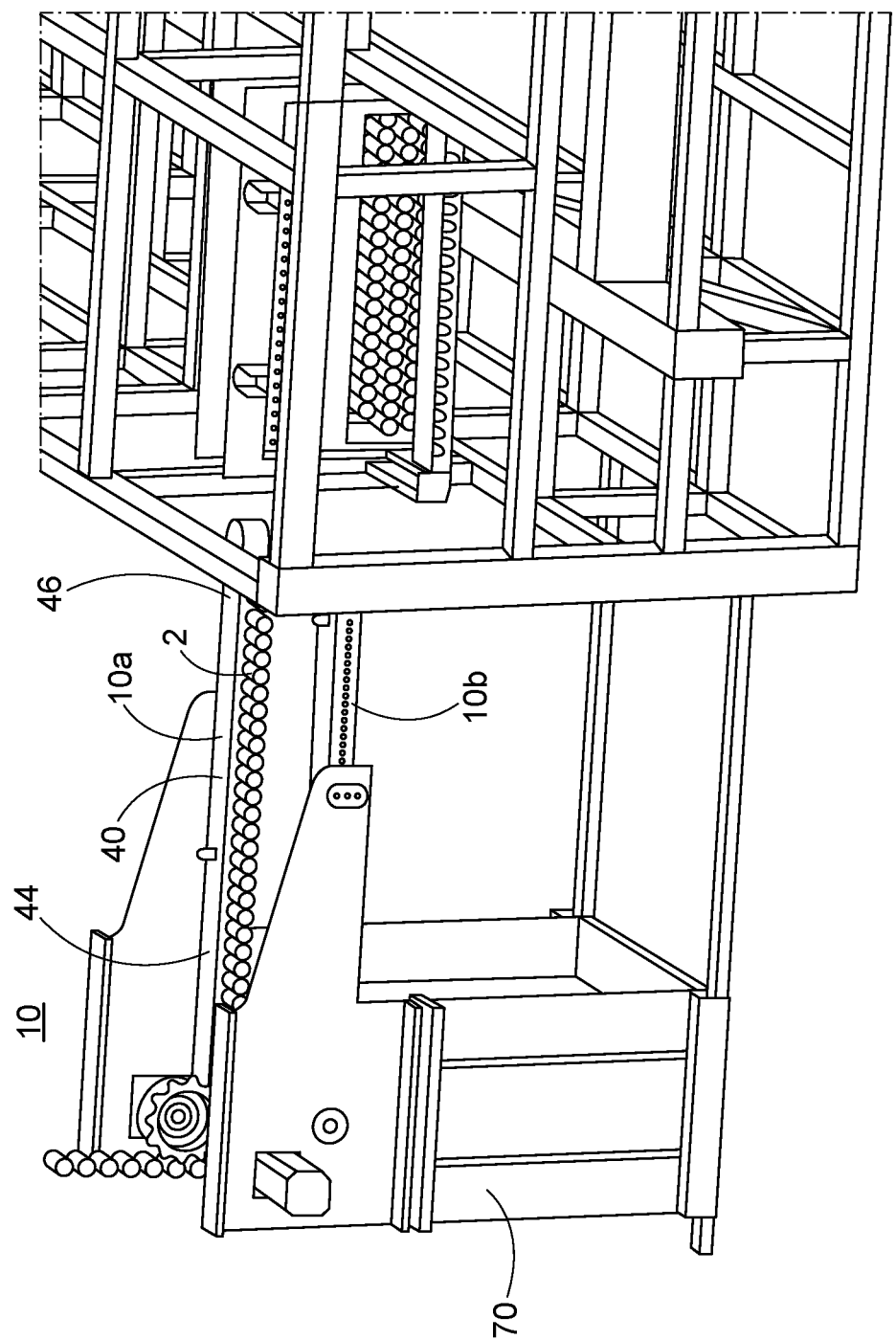
FIG. 1 is a perspective view of a can body loader assembly.
Figure 2:
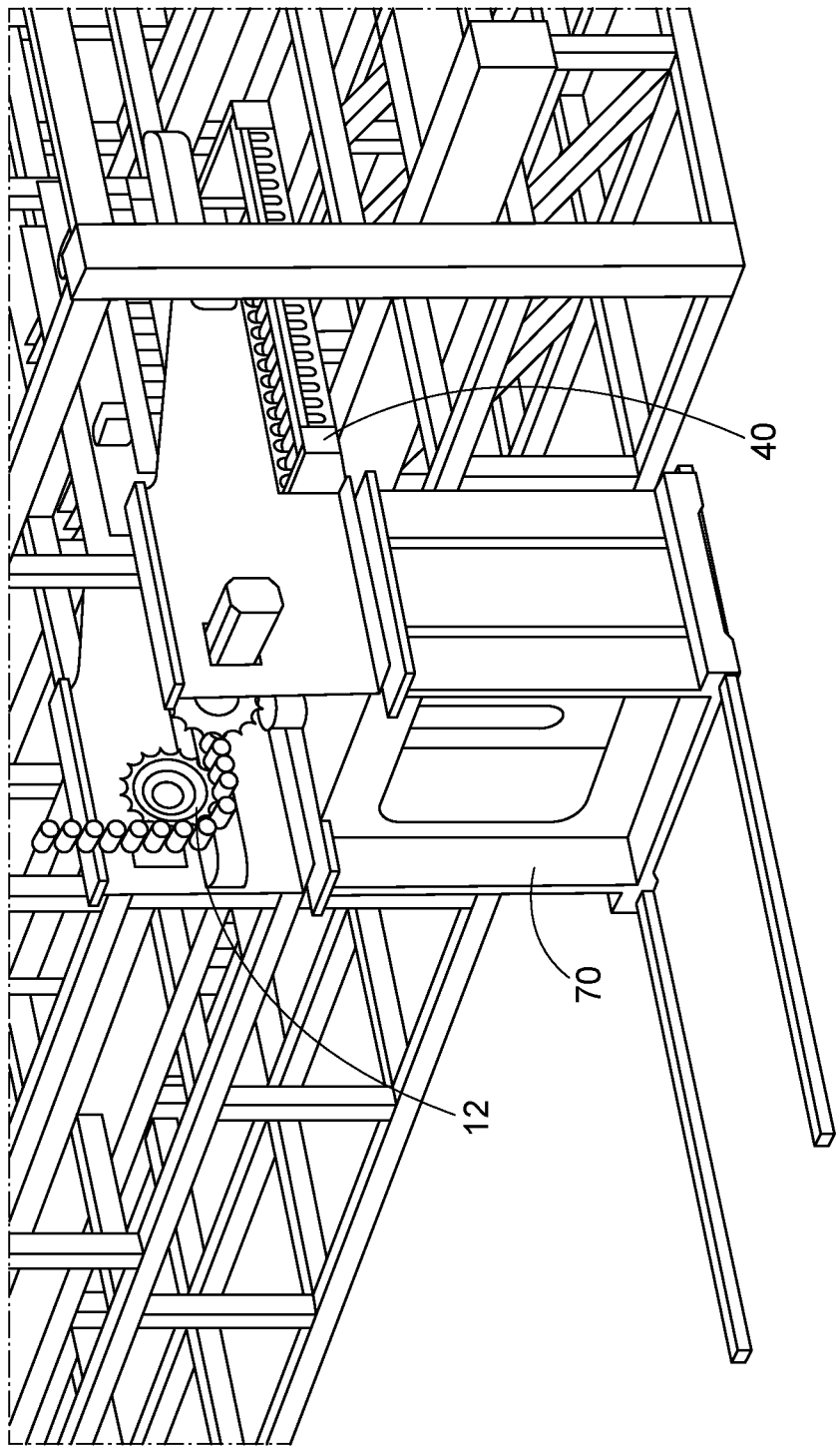
FIG. 2 is another perspective view of the loader assembly of FIG. 1, shown engaged with a discharge mechanism.
Figure 3:
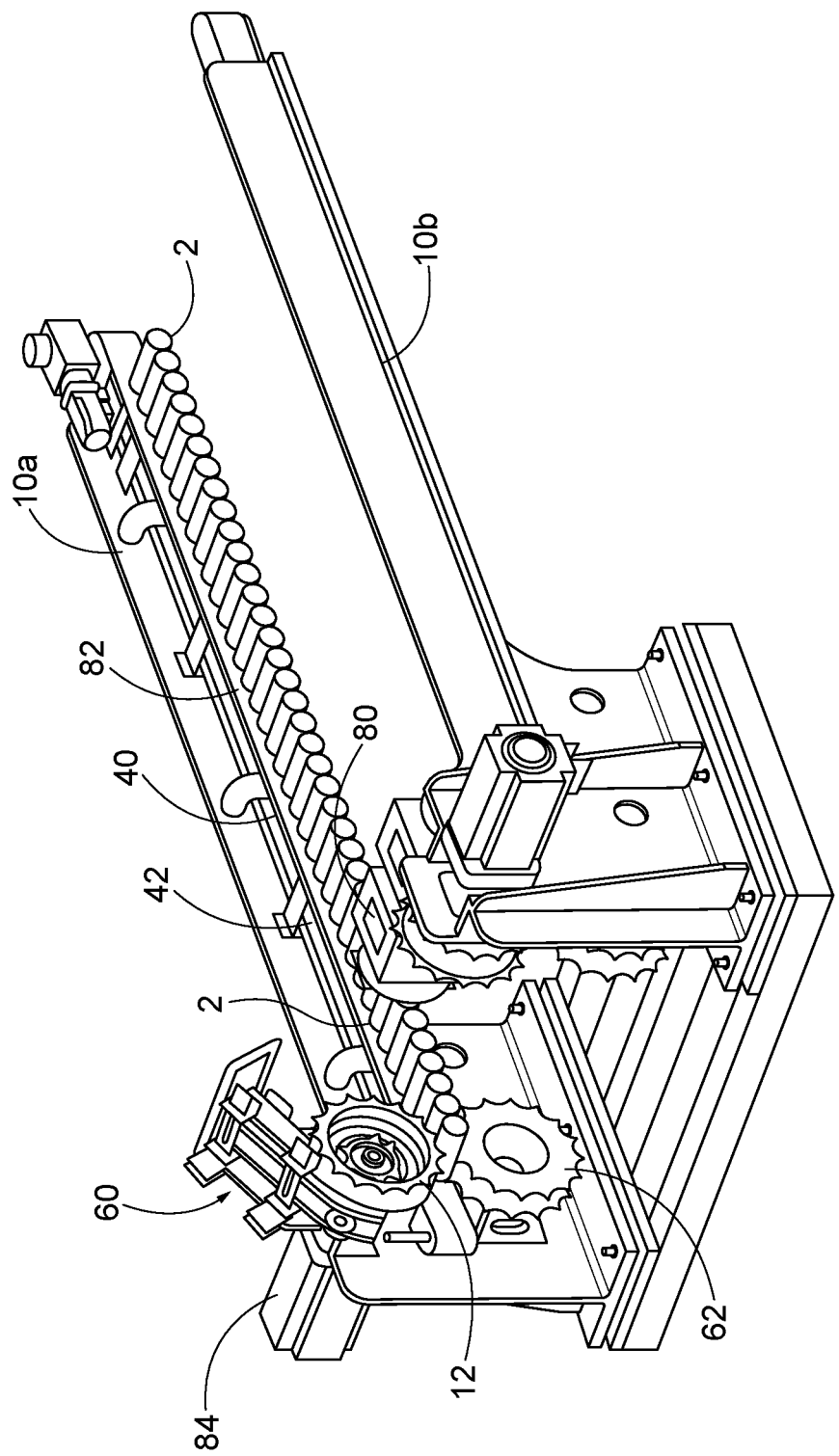
FIG. 3 is another perspective view of the loader assembly of FIG. 1.
Figure 4:
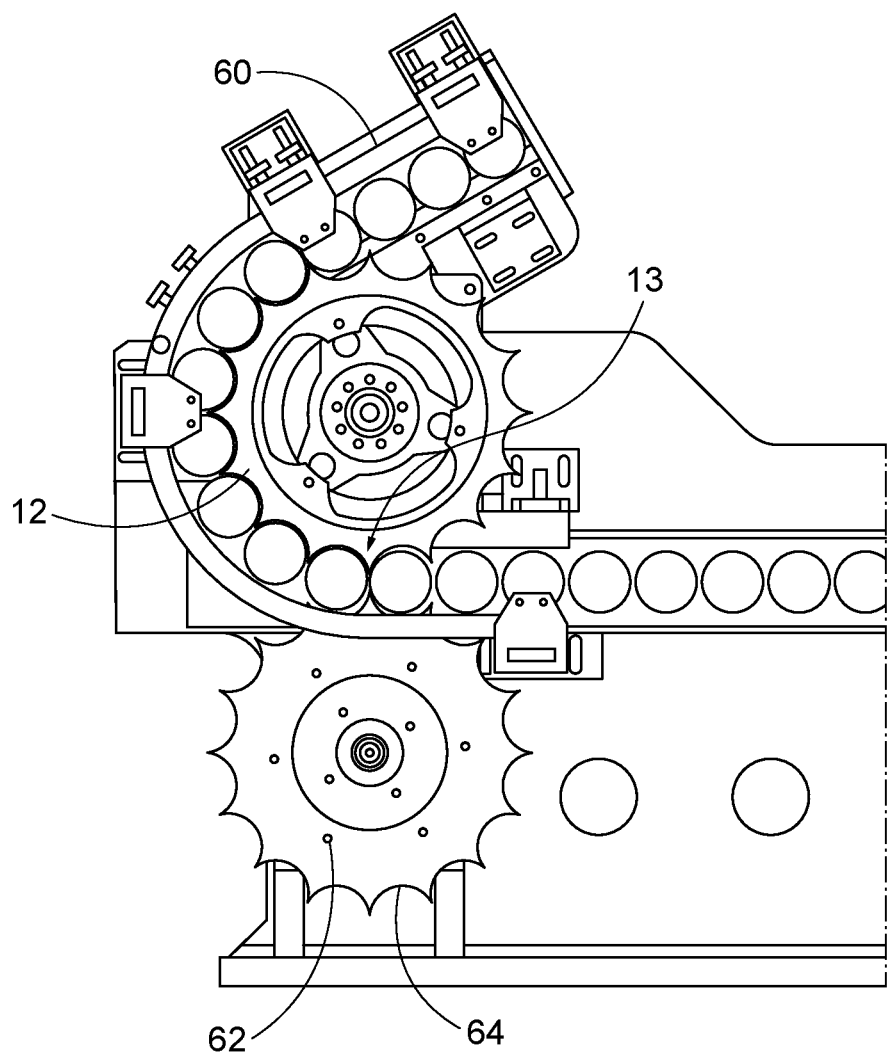
FIG. 4 is a side view of a portion the loader of FIG. 1 illustrating can body infeed.

Referring to the figures, a beverage can body loader assembly 10 is configured to load beverage can bodies 2 in a horizontal orientation to enable an array of mandrels, preferably from a carriage of a digital printing machine, to remove the can bodies from the loader 10. Preferably, the mandrels are as described in U.S. Pat. No. 9,770,922, entitled "Printing System and Method," which is incorporated herein by reference.

Loader 10 includes a pair of opposing loader assemblies 10a and 10b that preferably are parallel, synchronized, and mutually inward facing (that is, the open end of can bodies 2 face inwardly toward each other) to enable a printing system carriage located between the loader assemblies 10a and 10b. In this regard the carriage is positioned to offload can bodies from each one of assembly 10a and 10b. Preferably, loader assemblies 10a and 10b are identical except for their orientation. Accordingly, reference numerals without an appended letter refer to the structure of each loader assembly 10a and 10b.

Figure 5:
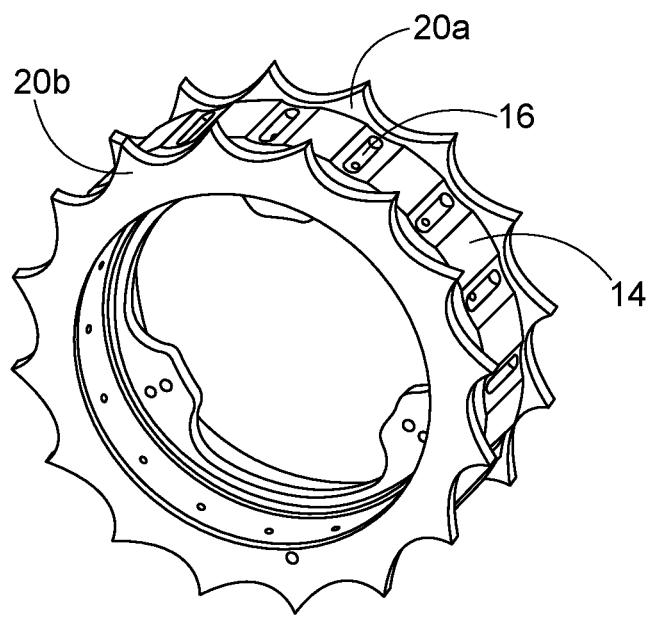
FIG. 5 is a perspective view of the can body infeed starwheel separated from the other components for clarity.

Loader assembly 10 includes a can loading turret 12 and a horizontally oriented vacuum belt 40. Turret 12 includes a turret body 14 and a pair of turret starwheels 20a and 20b, as best shown in FIG. 5. Turret body 14 includes recesses that include a vacuum port 16. Each starwheel 20a and 20b include pockets 22 that are aligned with the body recesses to hold can bodies 2 in place. Turret 12 in the embodiment shown in the figures is a single-piece construction. The present invention is not limited to a single-piece construction, but rather encompasses other configurations, such as a spacer between opposing starwheel plates. Further, the terms "turret" encompasses a single piece or multiple piece configuration.

Infeed chute 60 may supply can bodies to turret 12. The infeed structure includes guides and sensors to ensure the cans sit correctly within the turret pockets, as conventional in the field. And a lower turret 62 includes lower turret pockets 64 that are aligned with turret pockets 22 to aid as a guide to can bodies 2. Lower turret 62 may provide control of the can vertical position and horizontal pitch as the can transfers from the can loading turret via vacuum release, to the vacuum conveyor via vacuum onset [vacuum handshake].

Figure 6:
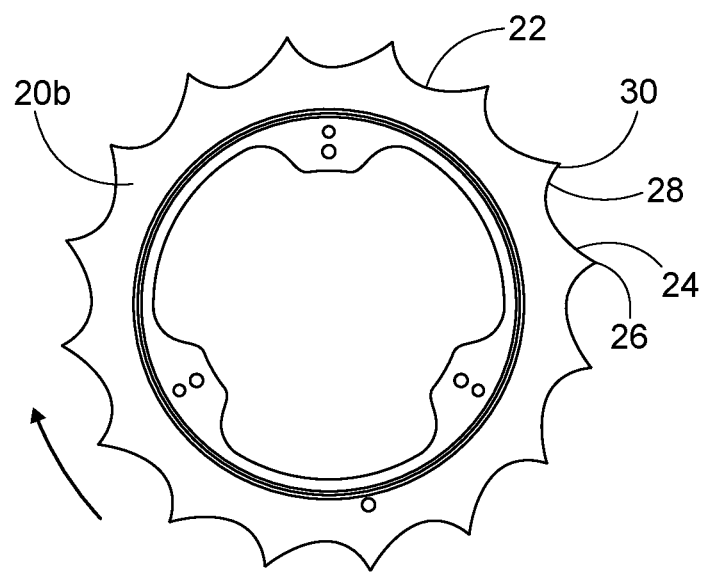
FIG. 6 is a side view of the starwheel of FIG. 5.
Figure 7:
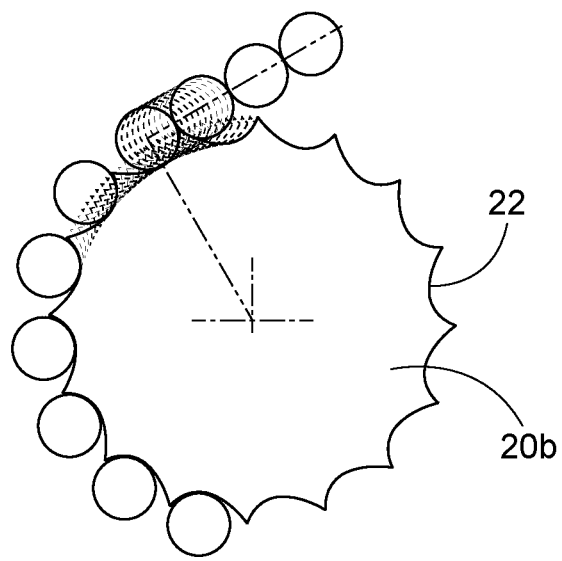
FIG. 7 is another view of the starwheel with cans engaged in the pockets.
Figure 8:
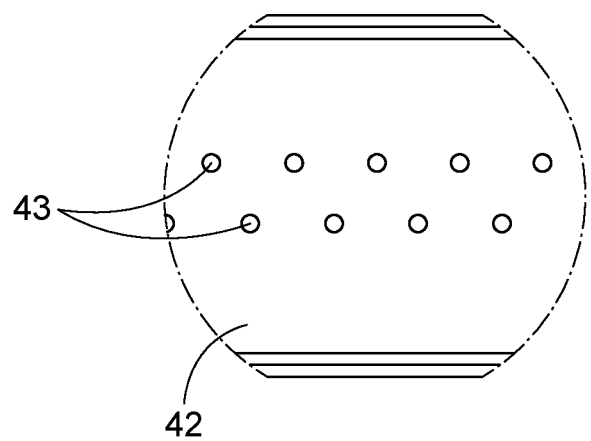
FIG. 8 is a view of a portion of a vacuum belt illustrating a belt hole pattern.

Referring to FIGS. 5, 6, and 7, each pocket 22 includes a leading tip or edge 26, a leading portion 24 that descends downwardly and rearwardly from the leading tip 26, a trailing portion 28 that smoothly merges from the leading portion 24 and preferably includes a trough, and a trailing tip or edge 30 at which the trailing portion 28 terminates. Each one of the pockets 22 may have an asymmetrical profile. The trough is defined as the point on pocket 22 having the smallest diameter from the center of the starwheel when oriented from the side, as in FIG. 6. The pockets 22 preferably are formed of a diameter that is slightly larger than the nominal diameter of the can body to allow for variation in incoming can size, which in some circumstances can prevent inadvertent denting of the can body sidewalls. In an aspect, the trailing portion 28 includes a portion having a radius that is approximately equal to an outside radius of the can bodies. The configuration of vacuum port 16 and its location relative to pocket 22 may be chosen according to parameters that will be understood by persons familiar with can body handling technology. As illustrated for example in FIG. 7, can body 2 is registered in the pocket (in some circumstances on the trailing side of pocket 22, measured along an arc between tips 26 and 30).

Vacuum belt 40 extends horizontally from a discharge region 13 (e.g. a point or location of discharge) of turret 12 to a distal end. Belt 40 includes a vacuum belt surface 42 having an array of through-holes to expose the bottoms of can bodies 2 to the vacuum pressure. In this regard, can bodies 2, for example and without limitation, include a conventional dome-shape on the bottom having any can body size, such as can sizes from 202 to 211. In the embodiment shown in the figures, belt 40 includes a compliant belt surface 42 on which the can bodies 2 are held by vacuum. In the embodiment shown in the figures, belt surface 42 is horizontal and 3.64 inches tall. Two parallel rows of holes 43 are longitudinal and are mutually staggered (that is, an upper hole is equidistantly spaced from the corresponding two adjacent holes in the lower row in a sawtooth configuration). The upper row is spaced 0.71 inches from the lower row and each hole in each row is horizontally spaced 1.00 inches from the adjacent holes in its row. The hole pattern described is merely an example and can vary according to can size and bottom design, vacuum pressure applied, belt speed, belt acceleration and deceleration, and like parameters.

Vacuum pressure is applied to the area of the belt 40 on which can bodies 2 are held. Preferably, belt 40 is divided into vacuum zones to aid in the operation of the belt, to aid in the release of the can bodies 2, and to conserve power. In the embodiment shown in the figures, an infeed end vacuum portion 44 may have vacuum pressure that is chosen for smooth hand-off of the can bodies from the turret 12 to the belt 40 and for secure holding of the cans on the belt surface 42. A discharge end vacuum portion 46 has vacuum pressure that may be chosen to promote retaining the can bodies 2 on belt surface 42 and also smooth release of can bodies 2 from belt surface 42. Optionally, the vacuum pressure in discharge end portion 46 may be cycled between high and low pressure or momentarily turned off when the spindles of the carriage engage the can bodies for removal from the belt. The present invention is not limited to any dimensions or configuration of the belt, nor to any method of employing the belt or vacuum, unless expressly stated in the claims, as the information provided herein in this regard is merely for example.

An inspection system may be provided to ensure correct spacing of the can bodies 2 and reject faulty cans, and a servo system may be provided to accurately increment belt 40. In this regard, an inspection camera 80 may be employed on each arm 10a, 10b to inspect cans in real time (preferably at a location beyond the last point of mechanical contact) for any damage that may interfere with loading of the cans onto the mandrels carriage. The system may include an air nozzle for rejecting can bodies that fail the inspection process. Preferably the air nozzle is located upstream of a can count sensor. An iTrack system is employed in the figures for illustration, and the present invention is not limited to any carriage or track system.

Optionally, a loader base 70 may be on rails to enable loader assembly 10 to move inward to be in position for engagement of the can bodies 2 with the mandrels and then outward to provide clearance for conveying of the mandrels. Other configurations and functions are contemplated.

In operation, a can body moves through infeed chute 60 (also referred to as track work) where a sensor signals that the cans are in position for loading onto turret 12. The turret 12 is rotated and the belt 40 is actuated to load a series or array of cans (such as 16 or 18 per arm, 32 or 36 total can bodies). Each can body is picked up by a pocket 22, where is it held by vacuum at port 16. When the can body reaches approximately a 6 o'clock position, the turret vacuum is removed. Vacuum baffles (not shown) allow vacuum strength and off position to be adjusted. Preferably the turret 12 is servo driven with a home identification feature to ensure sequencing with lower turret 62 and vacuum conveyor belt 40.

Can body 2 is positioned into a repeatable and precise location in pocket 22 in, or primarily in, the trailing portion 28, which has at least a portion that is configured to have the same or almost the same diameter as the can body outside diameter. The pockets of starwheels 20a and 20b are aligned such that can body longitudinal axis is parallel to the rotational axis of the starwheel and horizontal.

The pockets 22 are configured such that when the cans are registered in the pockets, a pitch dimension (that is an arc or circumferential dimension defined by the can centerlines) is equal or approximately equal to a predetermined pitch at which that can bodies are discharged on to vacuum belt 40.

Turret 12 rotates until it reaches its hand-off or discharge area, at which time the negative pressure at port 16 is turned off or diminished as the base of can body 2 contacts or engages belt surface 42 at belt infeed end 44. Turret 12 rotates and belt 40 advances until a desired number of can bodies are positioned at the discharge end 46 (e.g. distal end) of belt 40, at which time a control system 84 stops rotation of turret 12 and stops advancement of belt 40. During the pause in operation of the turret and belt, the carriage conveyance system removes (e.g. unloading phase) a predetermined number of can bodies (such as a group of 18 per each belt conveyor) from the belt 40 (either simultaneously from each arm 10a, 10b or one arm 10a, 10b at a time), as will be understood by persons familiar with conventional track conveyance systems for digital can printing. Upon unloading of the can bodies from the belt 40, the control system 84 again rotates turret 12 to move cans onto belt 40, which advances to position can bodies at discharge end 46 of belt 40. It is understood that the particular structure and function of the components described herein may be modified according to known parameters, such as can body diameter and weight, can body throughput, belt speed and acceleration and deceleration, and vacuum pressure.

The structure and function described herein is intended to position can bodies repeatably at a desired pitch (that is, longitudinal center to center spacing) suitable for engagement with mandrels on a carriage. In this regard, the loader assembly 10 is intended to register the can bodies at a centerline tolerance within +/−1 mm, preferably within +/−0.7 mm, and more preferably within +/−0.5 mm. The inventors surmise that the accuracy of the pitch dimension of +/−0.1 mm can be achieved. The small variations in pitch dimension are beneficial when the mandrels, which in some embodiments are slightly tapered, enter into the can bodies from the open end. As an example, a pitch dimension may be 70 mm. So the pitch dimension may vary between 69.5 mm and 70.5 mm when the centerline tolerance is +/−0.5 mm.

What is claimed:

1. A beverage can body loader assembly comprising a pair of opposing loader subassemblies, each subassembly comprising:
a can loading turret adapted for receiving horizontally oriented beverage can bodies, the can loading turret adapted for discharging the can bodies at a predetermined pitch;
a vacuum belt extending from a discharge region of the can loading turret, the belt being adapted for receiving the can bodies discharged from the can loading turret and adapted for transporting the can bodies in the horizontal orientation at the predetermined pitch; and
a control system configured to (i) start the can loading turret and vacuum belt to position an array of can bodies on the vacuum belt, (ii) to pause during an unloading phase in which a group of the can bodies is removed from the vacuum belt, and (iii) restart the can loading turret and vacuum belt to position another array of can bodies on the vacuum belt.

2. The loader assembly of claim 1 wherein the can loading turret includes an infeed starwheel having pockets adapted for receiving the can bodies.

3. The loader assembly of claim 2 wherein each one of the pockets of the infeed starwheel assembly has an asymmetrical profile.

4. The loader assembly of claim 3 wherein each pocket has a trailing portion and a leading portion, the trailing portion registers the can body in the pocket to define a pocket pitch that corresponds to the predetermined pitch of the can bodies on the vacuum belt.

5. The loader assembly of claim 4 wherein the trailing portion includes a portion having a radius that is approximately equal to an outside radius of the can bodies.

6. The loader assembly of claim 4 wherein the loader assembly is adapted to register the can bodies at a centerline tolerance within +/−1.0 mm.

7. The loader assembly of claim 4 wherein the loader assembly is adapted to register the can bodies at a centerline tolerance within +/−0.7 mm.

8. The loader assembly of claim 4 wherein the loader assembly is adapted to register the can bodies at a centerline tolerance within +/−0.5 mm.

9. The loader assembly of claim 4 wherein the can loading turret is an upper turret, the loader assembly further comprising a lower turret having pockets aligned with the pockets of the upper turret.

10. The loader assembly of claim 4 wherein the predetermined pitch is 70 mm for a 66 mm diameter can.

11. The loader assembly of claim 4 wherein the vacuum belt is oriented horizontally and includes holes for exposing bottoms of the can bodies to belt vacuum.

12. A method for feeding beverage can bodies comprising the steps of:
(a) feeding can bodies to a can loading turret;
(b) handing off the can bodies to pockets of the can loading turret in a horizontal orientation such that each can body extends in a horizontal direction from a base of the can body to a top of the can body;
(c) releasing the cans from a discharge region on the can loading turret and feeding the can bodies onto a linear vacuum belt at a predetermined pitch;
(d) conveying the can bodies on the belt toward a discharge end of the belt in the horizontal orientation such that each can body remains extending in the horizontal direction at the predetermined pitch; and
(e) pausing motion of the belt and the can loading turret while the can bodies are removed from the belt.

13. The method of claim 12 further comprising repeating steps (a) through (d) after the can bodies are removed from the belt in step (e).

14. The method of claim 12 wherein the feeding step (a) includes feeding the can bodies on an infeed track.

15. A method for feeding beverage can bodies comprising the steps of:
(a) feeding can bodies to a can loading turret;
(b) handing off the can bodies to pockets of the can loading turret;
(c) releasing the cans from a discharge region on the can loading turret and feeding the can bodies onto a linear vacuum belt at a predetermined pitch;
(d) conveying the can bodies on the belt toward a discharge end of the belt;
(e) pausing motion of the belt and the can loading turret while the can bodies are removed from the belt; and
repeating steps (a) through (d) after the can bodies are removed from the belt in step (e),
wherein the handing off step (b) includes positioning the can bodies into pockets having an asymmetrical profile that includes a trailing portion and a leading portion, the trailing portion registers the can body in the pocket that defines a radius that is approximately equal to an outside radius of the can bodies, thereby enabling the releasing step (c) to register the can bodies on the belt within +/−1 mm centerline tolerance.

16. The method of claim 15 wherein the registration is within +/−0.5 mm.

17. The method of claim 15 wherein the releasing step (c) includes enhancing release of the can bodies via a lower turret having pockets aligned with the pockets of the can loading turret.

18. The method of claim 15 wherein the predetermined pitch is 70 mm for a 66 mm diameter can.

19. The method of claim 15 further comprising the step of removing the can bodies from the belt including inserting mandrels into the can bodies during the pausing step (e).

20. The method of claim 19 wherein the removing step includes interrupting vacuum pressure to the discharge end of the belt.

* * * * *